3,290,218
STABLE PHARMACEUTICAL AND COSMETIC DISPERSIONS
Elkan Joachim de Jong, Rotterdam, Netherlands
No Drawing. Filed May 9, 1963, Ser. No. 279,312
Claims priority, application Netherlands, July 30, 1959, 241,825
6 Claims. (Cl. 167—82)

This application is a continuation-in-part of my copending application Serial Number 45,290, filed on July 26, 1960, and now abandoned.

This invention relates to stable dispersions and to methods of making the same, and more particularly to pastes and suspensions of pharmaceutically active ingredients for medical, cosmetic and similar uses.

It has been found that certain derivatives of cellulose which are mainly characterized by their insolubility in water are capable of acting as suspending agents when very finely divided. They are effective not only in the preparation of stable aqueous suspensions of the active ingredients but are equally useful in the preparation of dispersions of active ingredients in a non-aqueous carrier liquid, provided the cellulose derivative is substantially insoluble in the carrier liquid.

Methyl cellulose and sodium carboxymethyl cellulose (CMC) are being widely used as suspending agents. These substances dissolve colloidally in water to form more or less viscous liquids. The stability of dispersions formed with these water soluble cellulose derivatives increases as a function of solution viscosity and their applicability as suspending agents is limited by the maximum and minimum solution viscosities which are permissible. A suspension of excessive viscosity may be difficult to swallow when employed in an orally administered therapeutic composition and it may not be capable of passing through an injection needle of desirably small caliber. A suspension of adequately low viscosity may not retain a sufficient amount of active ingredient in suspension for a reasonable period of storage. The stability of a suspension is further influenced, as is well known, by the particle size of the active ingredient, by the difference between its specific weight and that of the carrier liquid, by the presence of electrolytes, of solvents, of surface-active substances, and by other factors. For pharmaceutical and cosmetic purposes, a reasonable amount of precipitation from the liquid suspension is tolerated if the precipitate can be redispersed in the liquid phase by shaking.

I have found that finely divided water-insoluble cellulose derivatives, and particularly ethyl cellulose having an average particle size of one to five microns, will hold a wide variety of active ingredients suspended in aqueous and non-aqueous carrier liquids in which the cellulose derivative is substantially insoluble. The range of concentrations of active ingredients that can be held in liquid suspensions of a satisfactorily low viscosity is much wider than that which can be produced with such soluble cellulose derivatives as methyl cellulose and CMC.

Insoluble cellulose derivatives such as insoluble grades of ethyl cellulose, which have an ethoxy content of at least 43 percent, are pharmacologically and chemically inert. They lack the swelling and gelling properties of the soluble derivatives which make the latter useful, for example, as bulk laxatives but limit their application where bulk effects and other consequences of solubility are undesired.

The types of cellulose derivatives which are useful for preparing the dispersions of this invention are thus limited by the solubility of the product. A degree of substitution of less than 1.4 makes ethyl cellulose water soluble, and such water soluble types of the ethyl ether of cellulose lack utility for the purposes of this invention. Commercial grades of ethyl cellulose having a degree of substitution higher than approximately 2.0 and, therefore, an ethoxy content of at least approximately 43 percent, are substantially insoluble in water and such ethyl cellulose will be referred to hereinafter as 'water-insoluble." All commercially available types of ethyl cellulose which satisfy the minimum requirement have been found operative. For reasons of convenience and ready availability, the commercial grade having a degree of substitution of 2.21 to 2.55 and an ethoxy content of 43 to 50% is preferred for the pharmaceutical and cosmetic applications for which the suspensions and other dispersions of the present invention are eminently suitable.

The viscosity of the cellulose derivative is selected according to the intended purpose. When ethyl cellulose of an ethoxy content of 47.5 to 49.0% is employed, a viscosity of 18 to 24 cps. as measured in a 5% solution in an 80:20 toluene-ethanol mixture will make the ethyl cellulose suitable for a range of applications wide enough to cover ointments, orally administered medicinal suspensions, and injectable liquids, including aqueous and non-aqueous carrier liquids containing a wide variety of concentrations of active ingredients. For practical reasons, such an almost universally applicable cellulose derivative is greatly preferred and has obvious advantages but it will be understood that the invention is not limited to any specific viscosity of the suspending agent. Ethyl cellulose types having viscosities as low as 8 to 11 cps. and as high as 150 to 250 cps. at a nominal ethoxy content of 47.5% to 49.0%, and ethyl cellulose having a viscosity designation of 80 to 105 cps. at an ethoxy content of 45.5 to 46.8% were found entirely satisfactory within the limits inherent in the viscosity of the resulting dispersions.

The water insoluble ethyl cellulose types described above are soluble in some organic solvents. They are generally insoluble in vegetable oils at room temperature, and finely divided ethyl cellulose of the type which is water-insoluble is capable of dispersing many medicinal and cosmetic compounds in such oils and other organic solvents to form pastes or suspensions of exceptional stability.

The cellulose derivative employed as a suspending agent in the method of this invention should be very finely divided and at least a major part thereof should have a particle size of one to five microns. Ethyl cellulose of the desired degree of comminution is readily prepared by the process disclosed in U.S. Patents, 2,843,582 and 2,843,583. When required for pharmaceutical applications, ethyl cellulose meeting the requirements of this invention may be sterilized with ethylene oxide in a known manner. Aqueous suspensions of the ethyl cellulose also lend themselves readily to wet sterilization at elevated pressure. The sterilized suspension is then preferably homogenized.

The concentration of ethyl cellulose required to form a stable dispersion of an active ingredient in a carrier liquid varies widely with the nature, concentration and particle size of the active ingredient. Quite surprisingly, relatively dilute suspensions of active solid ingredients which contain not more than 10% of the ingredient can readily be prepared if the particle size of the active ingredient is low, preferably below 10 microns. Such dilute suspensions are difficult to prepare and notoriously unstable when prepared with other suspending agents.

The stability of a dispersion employing water-insoluble ethyl cellulose will increase under otherwise identical conditions with the amount of ethyl cellulose in the dispersion. As little as 2% insoluble ethyl cellulose may not prevent formation of a sediment from a suspension of a solid in a liquid carrier but it will greatly facilitate redispersing of the sediment in the liquid by mere shaking. In view of the inherently greater stability of suspensions containing greater amounts of dispersed active ingredients, it will usually be found that satisfactory results are obtained by holding the combined concentration of active ingredient and ethyl cellulose within the range of 10 to 40%. In the great majority of dispersion systems, a combined concentration of 12 to 25% will be fully effective. It will be understood, though, that the invention is not limited to these preferred ranges which are mentioned solely for general guidance. In view of the many variables which influence dispersion stability and the different degrees of stability which are required for different applications, concentrations other than those specifically disclosed herein may be fully operative.

The cellulose derivatives of the invention are also useful in preparing suspensions of relatively high concentrations of active ingredients, such as 20 to 30% or even higher, which must combine great stability over extended storage periods with low viscosity. A few percent of an insoluble cellulose derivative such as an ethyl cellulose of the type described above will form suspensions having high concentrations of active ingredients. After extended storage, the viscosity of such suspensions remains high, but their viscosity can be lowered by shaking when it is desired to inject or pour the suspension. Yet, the normally high viscosity greatly enhances storage stability.

The influence of even small amounts of ethyl cellulose on suspensions, which are non-Newtonian structurally viscous liquids, is not limited to aqueous systems but also manifests itself in organic liquids in which the ethyl cellulose is substantially insoluble at the prevailing temperature. The difference between the viscosity after extended storage and the lower viscosity after agitation is substantially greater in suspensions according to this invention than that which may sometimes be observed with suspending agents which are soluble in water such as CMC, methyl cellulose, sodium alginate, pectine, and the like.

Ethyl cellulose is effective as a suspending agent even in the absence of surface active agents in the preparation of liquid suspensions. It is, however, compatible with most, if not all swelling agents, buffers, surfactants, preservatives, and auxiliary substances, such as lecithin, which may be added to prevent agglomeration of suspended particles. It is effective in the presence of soluble salts, sugars, polyvalent alcohols and such substances as polyvinylpyrrolidone. Care must be taken to avoid admixture to the carrier liquid of appreciable amounts of solvents in which ethyl cellulose is soluble, and which will make it soluble in the solution to an appreciable degree. An example of a solvent which should not be added to an aqueous system in sizeable amounts is ethyl alcohol.

The water-insoluble cellulose derivatives of the invention impart excellent stability to dispersions having a paste-like consistency, such as ointments, fatty and greaseless creams, salves and like preparations for external application. These dispersions will not leak liquid even after prolonged storage. They may contain high concentrations of solids and still remain easily spreadable over long periods of time. When these paste-like dispersions have a water base, they will tend to lose water quite rapidly by evaporation, and this property may be desirable. If not, it can be overcome by incorporating a humectant in the paste.

Dispersions of the invention are generally characterized by stability of viscosity. Dispersions prepared with ethyl cellulose according to this invention will not change in viscosity with time or they will change at a rate substantially lower than that observed with conventional dispersing and suspending agents under otherwise comparable conditions.

In preparing dispersions by the method of the invention, I employ conventional equipment well known in the chemical industries. The following examples are further illustrative of the present invention, and it will be understood that the invention is not limited thereto. All operaions are performed at room temperature (approximately 20° C.) unless otherwise specified.

*Example I*

A mixture of one part by weight of ethylcellulose with two parts of water is produced by homogenizing on the colloid mill. The ethylcellulose is of the insoluble type having an ethoxy content of 47.4 to 49.0 percent and a viscosity of 18 to 24 cps. when measured in a 5% solution in a mixed solvent of 80 parts toluene and 20 parts ethanol. A particle size analysis shows about 90% by weight of the material to have a particle size between one and five microns, and the average particle size to be well within this range. The particle size distribution is not affected by treatment on the colloid mill.

The homogenized suspension of 33⅓% ethylcellulose is referred to hereinafter as "ethylcellulose suspension." It is employed in making a sulfadiazine suspension for oral application as follows:

2 g. of sodium hydroxide are dissolved in 30 ml. water. 30 ml. 63% sugar syrup are added, and 10 g. sulfadiazine are dissolved in the alkaline mixture. 15 g. ethylcellulose suspension are added, and thereafter a solution of 4 g. citric acid in 20 ml. water. The solution is stirred well during the addition of the acid. Finally, 1 ml. of a 10% solution of methyl p-hydroxy-benzoate in ethanol is added as a preservative, and enough water to make the total volume 100 ml. The mixture is homogenized in a hand homogenizer.

The resulting suspenison of sulfadiazine in an aqueous medium is very stable.

*Example II*

10 g. of piperazine adipate are mixed with 30 g. of ethyl-cellulose suspension, and the mixture is diluted to a volume of 100 ml. by addition of 63% sugar syrup. The resulting suspension is homogenized in a hand homogenizer.

A suspension of piperazine adipate for oral application is obtained. It is very stable and remains useful after extended storage.

*Example III*

10 g. of basic bismuth gallate are mixed with 30 g. of ethyl-cellulose suspension, and the mixture is diluted with water to a volume of 100 ml. The resulting suspension of basic bismuth gallate is homogenized in a hand homogenizer.

On standing, the suspension has a tendency to form a small amount of precipitate which is resuspended at once when the container holding the suspension is shaken. The suspension is employed as an enema.

*Example IV*

1 g. of sodium carboxymethylcellulose of high viscosity pharmaceutical grade is ground with 100 g. of ethylcellulose suspension. A viscous paste is obtained. It forms an excellent greaseless ointment base which may be combined with pharmaceutically active ingredients.

The carboxymethylcellulose content of the paste can be increased beyond 1% without loss of stability. The paste tends to dry rapidly when applied to the skin. If this is undesirable, it can be prevented by incorporating glycerine of other humectants.

*Example V*

10 g. ethylcellulose powder of the insoluble type having an ethoxy content of 47.4 to 49.0%, and a viscosity of 18 to 24 cps., and being finely ground so that 90% of the particles are between 1 and 5 microns in size, are mixed by mortar and pestle with a mixture of 60 g. of zinc oxide and 40 g. sesame oil.

An oil base zinc oxide ointment is obtained which may be stored for 12 months or more without leaking oil. If the ointment is processed on an ointment roller after mortar grinding, its appearance is improved.

*Example VI*

10 g. ethylcelulose powder of the type employed in Example V are ground with 20 g. polyethylene glycol (M.W. abt. 400), and 3 g. undecylenic acid are worked into the mixture. The resulting ointment is still homogeneous after 12 months and can be readily spread.

*Example VII*

Ethylcellulose suspension is heated in an autoclave to 115° C. for 30 minutes. It is then homogenized in a sterile colloid mill.

100 g. of finely divided procaine penicillin G having a particle size of 65% by weight under 5 microns and a titer of 1000 units per milligram are dispersed in 300 g. of the sterile homogenized ethyl-cellulose suspension. The volume is made up to one liter by the addition of an aqueous solution containing 0.4% sodium citrate, 0.05% methyl p-hydroxy-benzoate, and 0.05% propyl p-hydroxybenzoate, and the liquid mixture is homogenized in a colloid mill.

A stable injectable solution containing 100,000 units of penicillin per ml. is obtained.

*Example VIII*

300 g. of the procaine penicillin powder of Example VII are mixed with 120 g. of the sterilized homogenized ethylcellulose suspension and with sufficient sterile water to make one liter. The aqueous mixture is homogenized in the colloid mill.

An injectable penicillin solution having an activity of 300,000 units per ml. is obtained. If desired, water may be replaced by an aqueuos solution containing buffering agents and preservatives of the type employed in Example VII.

*Example IX*

Ethyl cellulose powder of the type employed in Example V is sterilized by means of ethylene oxide by the method described by A. T. Wilson, J. Exp. Med 91, 449 (1950).

100 g. finely divided procaine penicillin G of the type described in Example VII above is mixed with 50 g. of the sterilized ethyl cellulose powder and arachis oil is gradually worked into the mixture until the total volume reaches one liter.

The mixture, after homogenizing, forms a stable injectable suspension of procain penicillin G in oil which has a potency of 100,000 units per ml. and is perfectly stable.

*Example X*

2 g. chloramphenicol are dissolved with gentle heating in 63 g. propylene glycol. The solution is mixed with 35 g. sterilized finely ground ethylcellulose powder. A stable antibiotic ointment is obtained which will not separate during storage.

When the ethylcellulose employed in Example I is replaced by ethylcellulose types of similar particle size distribution, but having respective viscositions of 8 to 11 cps., 40 to 52 cps. and 150 to 250 cps., combined with a nominal ethoxy content of 47.4 to 49.0 percent, ethylcellulose suspensions are obtained which differ from that of Example I in viscosity, but are equally useful in preparing the several products described in Examples I, II, III, VII, and VIII. Similarly, an ethylcellulose having a viscosity of 80 to 105 cps. at an ethoxy content of 45.5 to 46.8% may be substituted without forfeiting the basic advantages of this invention.

The aforedescribed types of ethylcellulose may also be incorporated in the preparation of pharmaceutical compositions as described in Examples IV, V, VI, IX, and X without impairingth e results obtained beyond the inherent differences in the viscositions of the products.

While the invention has been described with particular reference to specific embodiments, it is to be understood that it is not limited thereto but is to be construed broadly and restricted solely by the scope of the appended claims.

What I claim is:

1. A dispersion of a pharmaceutically or cosmetically active solid material in a carrier liquid therefor, said solid material being finely divided and substantially insoluble in said liquid, said dispersion containing less than, 40% by weight of a suspending agent consisting of a dispersed solid phase of ethyl cellulose being insoluble in said liquid and having an ethoxy content of at least 43 percent, at least a major portion of said ethyl cellulose having a particle size between one and five microns.

2. A disperson as set forth in claim 1, said ethyl cellulose having an average particle size between one and five microns.

3. A dispersion as set forth in claim 1, the combined weight of said solid material and of said ethyl cellulose in said dispersion being between approximately 10 and 40% of the weight of said dispersion.

4. A dispersion as set forth in claim 1, said ethyl cellulose having a viscosity of substantially 18 to 24 centipoise when measured in a 5% solution of said ethyl cellulose in a mixed solvent of 80 parts toluene and 20 parts ethanol.

5. A dispersion of a pharmaceutically or cosmetically active solid material in a carrier liquid therefor, said solid material being finely divided and substantially insoluble in said liquid, said dispersion containing less than 40%, by weight of a suspending agent consisting of a dispersed solid phase of a cellulose derivative substantially insoluble in said liquid, at least a major part of said cellulose derivative having a particle size between one and five microns.

6. A dispersion as set forth in claim 5, wherein the carrier liquid is water.

References Cited by the Examiner

UNITED STATES PATENTS 2,796,381  6/1957  Borst _____ 167—63 X
2,814,570  11/1957  Sloan _____ 106—197

OTHER REFERENCES

American Professional Pharmacist vol. 7, No. 4, April 1941 pp. 225–227 and vol. 7, No. 5 May 1941 pp. 296–297.

Remington's Practice of Pharmacy 9th Ed., Mack Pub. Co., 1948, Easton, Pa., pp. 169–173.

Ott et al., "Cellulose and Cellulose Derivatives," Part II, Interscience Pub., Inc., New York, 1955 pp. 925–929.

Merck Index, Merck and Co. Inc., Rahway, New Jersey, 6th Ed., 1952, pp. 408 to 409.

Martin et al., "Remington's Pharmaceutical Scienes," Mack Pub. Co., Easton, Pa. 13th Ed., 1965, pp. 1436–1437.

JULIAN S. LEVITT, *Primary Examiner.*

G. A. MENTIS, *Assistant Examiner.*